United States Patent
Rombold

(10) Patent No.: US 8,752,664 B2
(45) Date of Patent: Jun. 17, 2014

(54) STEER-BY-WIRE STEERING SYSTEM HAVING AN ELECTROMECHANICAL STEERING LOCK

(75) Inventor: Manfred Rombold, Winnenden-Hofen (DE)

(73) Assignee: ThyssenKrupp Presta AG, Eschen (LI)

( * ) Notice: Subject to any disclaimer, the term of this patent is extended or adjusted under 35 U.S.C. 154(b) by 0 days.

(21) Appl. No.: 13/504,549

(22) PCT Filed: Oct. 28, 2010

(86) PCT No.: PCT/EP2010/006580
§ 371 (c)(1),
(2), (4) Date: Apr. 27, 2012

(87) PCT Pub. No.: WO2011/054475
PCT Pub. Date: May 12, 2011

(65) Prior Publication Data
US 2012/0205183 A1  Aug. 16, 2012

(30) Foreign Application Priority Data
Nov. 6, 2009 (DE) .......................... 10 2009 053 226

(51) Int. Cl.
*B62D 5/00* (2006.01)

(52) U.S. Cl.
USPC ......................................... 180/402; 180/444

(58) Field of Classification Search
USPC .......................... 180/402, 444, 400
See application file for complete search history.

(56) References Cited

U.S. PATENT DOCUMENTS

| | | | | |
|---|---|---|---|---|
| 5,024,391 A * | 6/1991 | Zygutis et al. | ............. | 242/381.1 |
| 6,488,115 B1 * | 12/2002 | Ozsoylu et al. | ............. | 180/444 |
| 6,547,031 B1 * | 4/2003 | Magnus | .................. | 180/444 |
| 6,571,587 B2 * | 6/2003 | Dimig et al. | .................. | 70/186 |
| 6,820,713 B2 * | 11/2004 | Menjak et al. | ............... | 180/402 |
| 7,111,480 B2 * | 9/2006 | Dimig et al. | .................. | 70/186 |
| 7,293,626 B2 * | 11/2007 | Ozsoylu et al. | ............. | 180/444 |
| 8,162,095 B2 * | 4/2012 | Bootz et al. | ................. | 180/406 |
| 2011/0094820 A1 * | 4/2011 | Bootz et al. | ................. | 180/422 |

FOREIGN PATENT DOCUMENTS

| | | |
|---|---|---|
| DE | 10 2006 056 042 A1 | 5/2006 |
| DE | 10 2005 055 730 A1 | 6/2007 |
| DE | 10 2007 039 733 A1 | 2/2009 |

(Continued)

OTHER PUBLICATIONS

International Preliminary Report on Patentability and Written Opinion issued in PCT/EP2010/006580 mailed May 8, 2012.

(Continued)

*Primary Examiner* — Joseph M Rocca
*Assistant Examiner* — Conan Duda
(74) *Attorney, Agent, or Firm* — Novak Druce Connolly Bove + Quigg LLP

(57) ABSTRACT

The invention relates to a steering device for a road vehicle according to the steer-by-wire principle with a steering wheel that can be operated by a driver and with a steering gearbox that is not permanently mechanically coupled in a forcible manner, which is equipped with an electric motor drive for swivelling steered wheels, wherein the electric motor drive comprises an electric motor, a pinion (1), a belt (2) and a belt pulley (3), wherein the belt pulley (3) is coupled via the gearbox to a threaded spindle (4), and wherein an electromechanical blocking of the electric motor drive is provided on or in the steering gear.

6 Claims, 3 Drawing Sheets

(56) References Cited

FOREIGN PATENT DOCUMENTS

| | | | | |
|---|---|---|---|---|
| DE | 10 2008 021 973 A1 | 11/2009 | | |
| FR | 2 793 749 A1 | 11/2000 | | |
| FR | 2 909 954 A1 | 6/2008 | | |
| JP | 2004-237785 | * | 8/2004 | ............... B62D 5/04 |
| JP | 2004-268754 A | 9/2004 | | |

OTHER PUBLICATIONS

International Search Report and Written Opinion of the International Searching Authority, International Application No. PCT/EP2010/006580, dated Feb. 2, 2011.

International Search Report, International Application No. PCT/EP2010/006560, dated Feb. 2, 2011 (English language).

* cited by examiner

STEER-BY-WIRE STEERING SYSTEM HAVING AN ELECTROMECHANICAL STEERING LOCK

CROSS-REFERENCE TO RELATED APPLICATIONS

This Application is a National Stage of International Application No. PCT/EP2010/006580 filed on Oct. 28, 2010, and claims priority of Application No. 10 2009 053 226.9 filed on Nov. 6, 2009, in Germany. The disclosures of the prior applications are incorporated, herein in their entirety by reference.

The present invention relates to a steer-by-wire steering system having the features of the preamble of claim 1.

The steering systems currently used in passenger vehicles and commercial vehicles are almost exclusively steering systems with a steering wheel, a steering shaft and a gearbox, which converts a rotational movement of the steering wheel into a translational movement of the track rods of the steered wheels. In the passenger vehicle sector rack-and-pinion steering systems with hydraulic or electrical servo assistance are exclusively used for this purpose. As is known, in these steering systems a steering wheel lock is used to prevent theft, which in the activated state mechanically or electromechanically blocks the steering shaft and thereby prevents a rotation of the steering wheel as well as a swivelling of the steered wheels. A secondary effect is that the blocked steering wheel is often used as a handle to facilitate getting into and out of the vehicle.

In a steering system with a direct coupling of the steering wheel via a steering shaft with the steering gearbox it is proposed in FR 2793749 A1 to provide the electromechanical locking on the servomotor. To this end a locking bolt is for example inserted into a matching bore of the rotor of the servomotor and blocks the servomotor and thus the whole steering system. The background of this solution is to remove the steering lock from the region of the steering column, in order to free installation space and prevent possible harm to the driver caused by the steering lock in the event of an impact. This steering system is not a generic steer-by-wire steering system.

A generic steering system is known from DE 10046167 A1. In this steering system there is a mechanical separation between the operating part, consisting of the steering wheel and upper steering shaft, and the gearbox part, consisting of the steering gear and a servo drive. In this steering system an electromechanical clutch is used as steering lock, which connects the steering wheel via the steering shaft in a torque-resistant manner to the chassis. In this way a rotation of the steering wheel is prevented when the coupling is engaged in the locking position, as in the case of a steering lock. The steering wheel cannot turn freely and can furthermore be used as a handle. The steering gear is however not blocked, so that a swivelling of the wheels is still technically possible as before.

The object of the present invention is accordingly to improve a steer-by-wire steering system, in which the swivelling movement of the front wheels is blocked when the steering lock is engaged. This object is achieved by a steering system having the features of claim 1.

Since an electromechanical blocking of the electromechanical drive is provided on or in the steering gearbox, the steer-by-wire steering system cannot be swivelled, even if the steering lock possibly present on the steering wheel side is forced. Furthermore, when the steering system is locked the vehicle cannot be shunted by swivelling the wheels by external application of a force, for example by hand.

Advantageously the gearbox comprises a pinion driven by the electric motor, a belt and a belt pulley, the belt pulley being coupled via the gearbox to a threaded spindle. It may however also be envisaged that the drive comprises a tube motor that engages directly with a recirculating ball system or a shaft gear arrangement. A drive via a gear train without employing a belt drive is also possible.

If the steering system comprises a drive motor, a toothed belt gear and a recirculating ball system for converting the rotational movement of the toothed belt gear into a linear movement of the threaded spindle and a locking element is provided for blocking the toothed belt gear, the locking device can be integrated in a simple manner in the steering gear.

A blocking in an arbitrary position of the steering gear is possible if a frictional resistance is exerted via a brake shoe pressed in the radial direction against the belt drive and in particular against the call nut. The brake shoe can be actuated via a cam and a return spring. A catch-type locking device can engage in the teeth of the belt drive, in particular of the belt pulley connected to the recirculating ball system, or in teeth of the toothed belt. In this connection teeth specifically for the locking device can also be arranged on the outside of the toothed belt.

A positive engagement locking can be effected if a catch lug or a locking bolt can be electromechanically inserted into corresponding radial or axially parallel recesses of the belt pulley or ball nut.

Exemplary embodiments of the present invention are described in more detail hereinafter with the aid of the accompanying drawings, in which.

Figure 1:
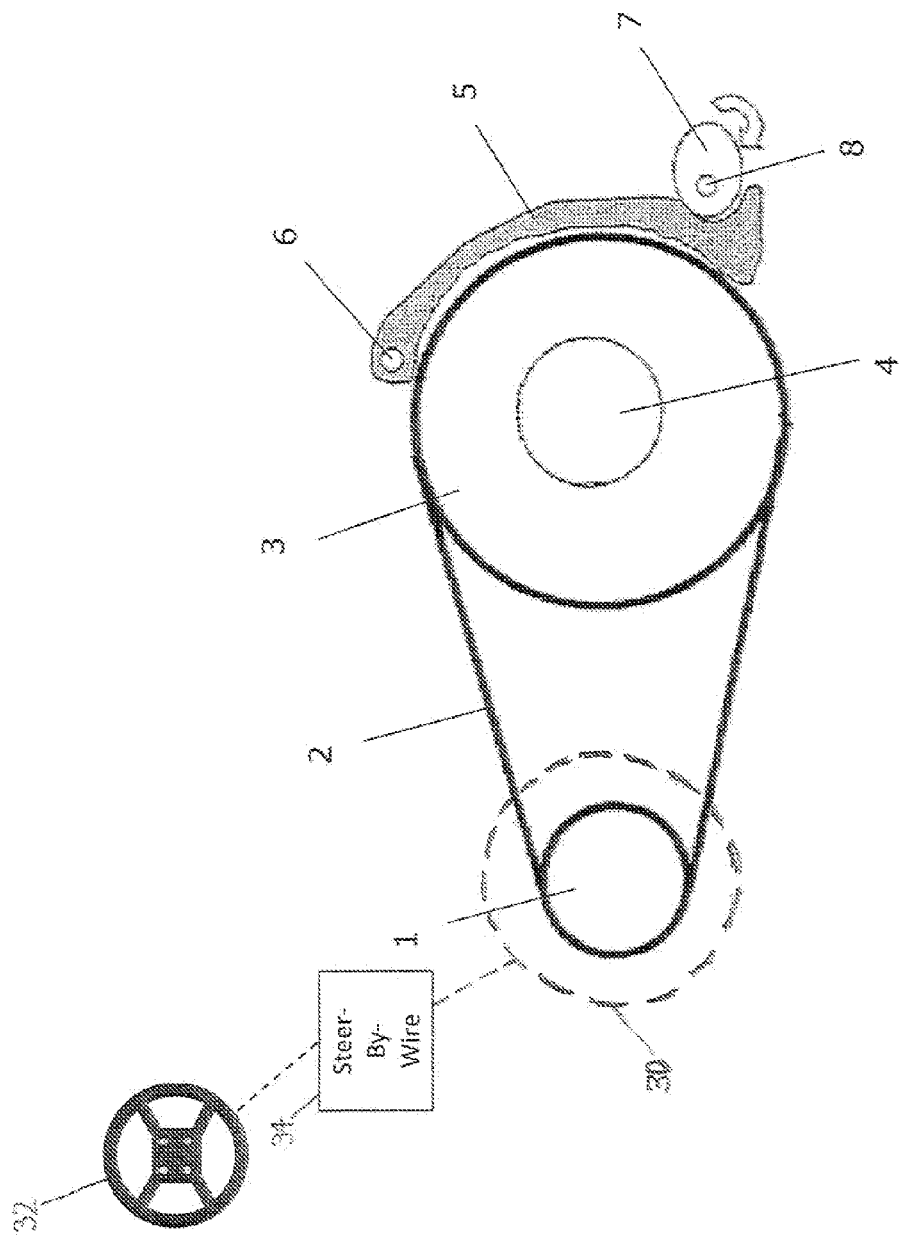
FIG. 1 shows a belt drive for an electromechanical steer-by-wire steering system with a frictional resistance type brake shoe.
Figure 3:
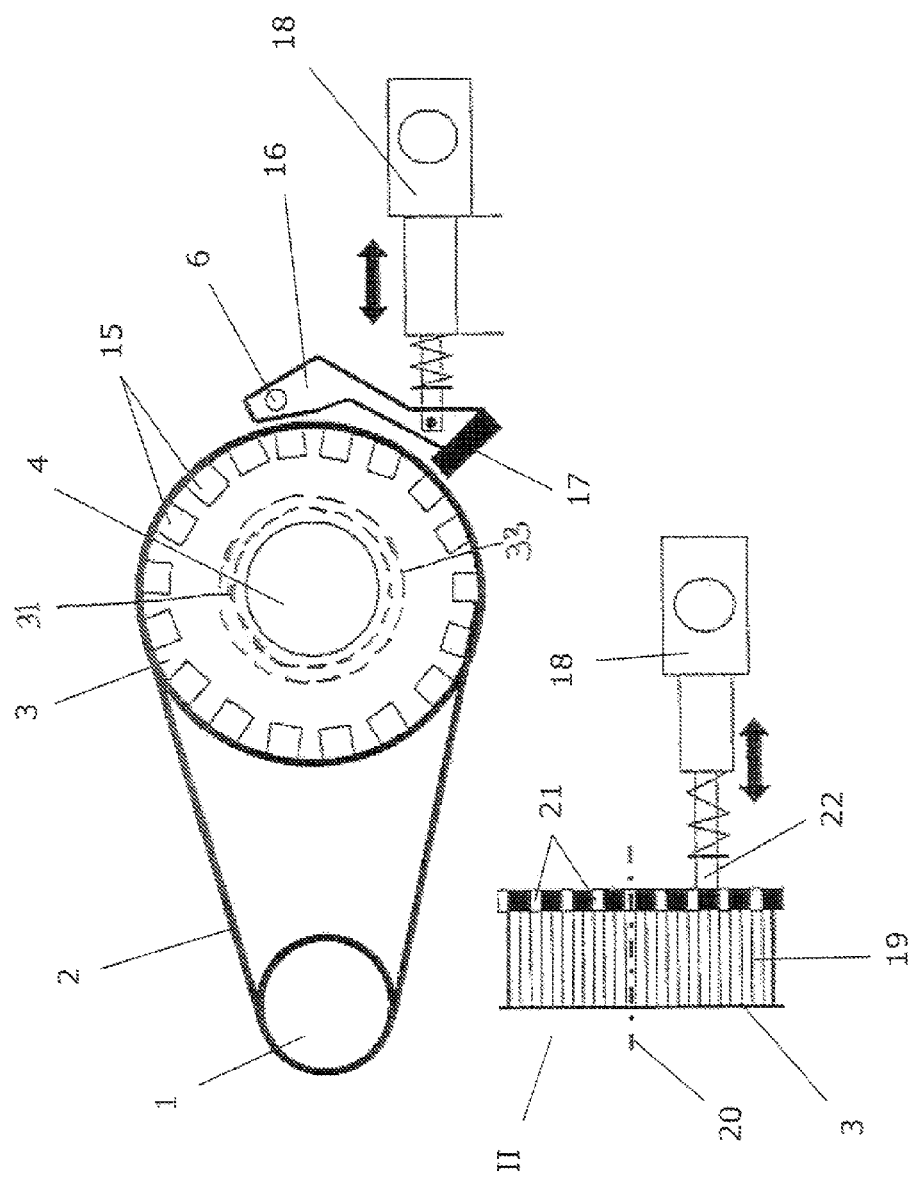
FIG. 3 shows a positive engagement type locking of an electromechanical steer-by-wire steering system by means of pins engaging radially or in an axially parallel manner.

A belt drive is schematically illustrated in FIG. 1, and comprises a pinion 1 of an electric motor 30, a belt 2 and a belt pulley 3. The belt 2 is preferably formed as a toothed belt. The belt pulley 3 is connected in a torque-resistant manner known per se to a recirculating ball system 33, which includes ball nut 31, as shown in FIG. 3, which converts the rotational movement of the belt pulley 3 into an axial displacement of a threaded spindle 4, shown only in outline. The threaded spindle 4 likewise drives the steering movement of steered wheels of a vehicle in a known manner via track rods and steering stub axles. The pinion 1 is driven by the electric motor 30 depending on an electronic control 34, which may be part of a steer-by-wire system 34 coupled to a steering wheel 32. By reaction on the steered wheels and thereby on the threaded spindle of a vehicle, the gearbox can conversely also be moved without triggering the electric motor.

In order to prevent this movement in the locked state, a locking device is provided that comprises a brake shoe 5 that is swivelably arranged about a swivel bearing 6. The brake shoe 5 surrounds the belt pulley 3 over a specific angular range of about 120°, and in the illustrated freely rotatable position of the belt pulley 3 is spaced from the belt pulley and the toothed belt. An adjustment cam 7 is rotatably arranged in abutment with the brake shoe 5 about an axis 8. The axis 8 is the output side of an electric motor screw drive with a position recognition. The illustrated position is the non-locked position.

With a locking of the steer-by-wire steering, the screw drive of the shaft 8 is triggered in the manner of a steering so as to rotate the cam 7 by 90° to 180°. In this way the shoe 5 is swivelled about the swivel axis 6 and is pressed against the outer circumference of the belt pulley 3 or against the outer surface of the toothed belt 2. The belt drive illustrated in FIG. 1 is thereby blocked. Also, axial loads of the threaded spindle 4 then do not lead to a rotation of the belt pulley 3. The steering system is consequently blocked, and specifically also against any attempt to swivel the steered wheels manually from the outside or by means of a tool.

A reverse rotation of the cam 7 leads in conjunction with a return spring to the release of the locking.

Figure 2:
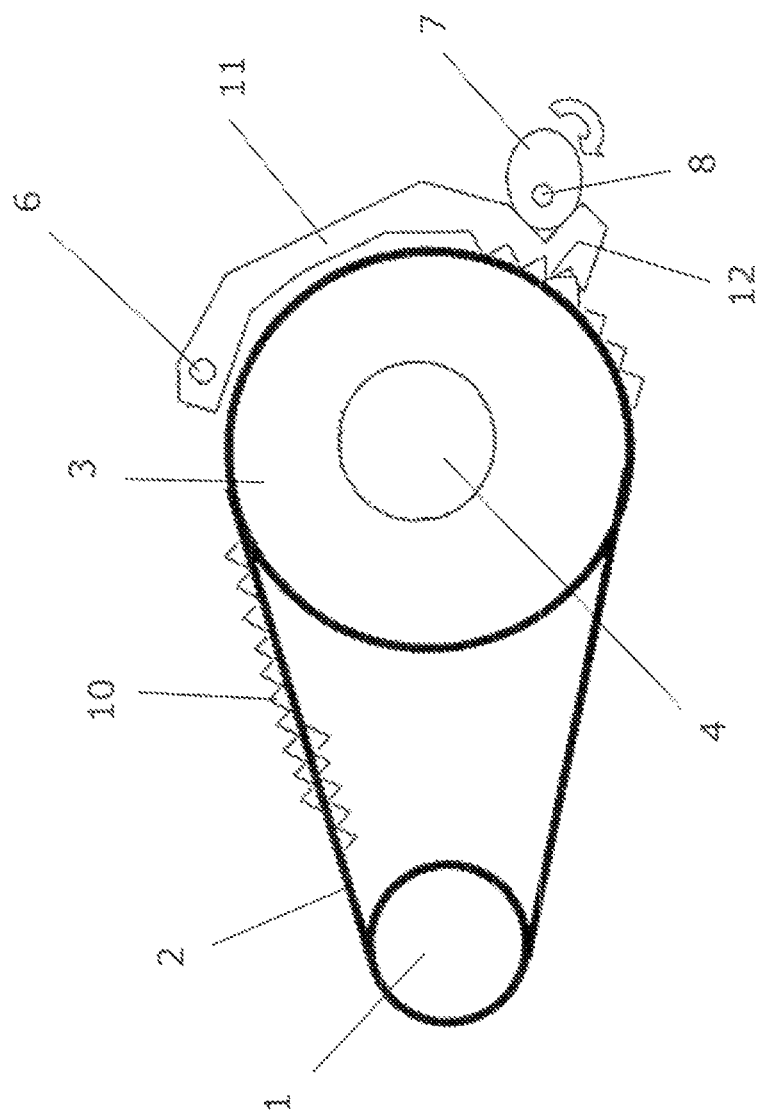
FIG. 2 shows a steering system similar to FIG. 1 with a brake shoe lockingly engaged in a toothed arrangement.

A similar embodiment of the present invention is illustrated in FIG. 2. FIG. 2 shows again a toothed belt drive with the motor pinion 1, the toothed belt 2 and the belt pulley 3, as well as the threaded spindle 4. In this embodiment the toothed belt is provided with an additional outer toothed arrangement 10. A brake shoe 11 comprises a compatible toothed arrangement 12 facing towards the outside of the toothed belt and the outer toothed arrangement 10. In the locked state the toothed arrangement 12 of the brake shoe 11 engages in the outer toothed arrangement 10 of the toothed belt and blocks this by positive engagement, so that the locking cannot be forced even under considerable application of force. This would theoretically be possible in the locking arrangement of FIG. 1.

FIG. 3 shows another embodiment of the present invention with positive engagement locking. In this embodiment the belt drive is again provided with the pinion 1, the toothed belt 2 and the belt pulley 3. Also, the threaded spindle 4 is included as in the previous exemplary embodiments. The belt pulley 3 is here provided with a number of radial recesses 15, which are distributed over the circumference of the belt pulley 3. The recesses 15 are arranged in the axial direction of the threaded spindle 4 adjacent to the toothed belt. A locking arm 16 is swivellably arranged about the swivel bearing 6, adjacent to the belt pulley 3. A locking pin 17 on the free end of the locking arm 16 is oriented so that, with a swivelling movement of the locking arm 16 about the swivel bearing 6, the locking pin 17 can engage in the recesses 15 and can be displaced again from the latter. An electromechanical actuator 18 of a construction known per se is provided as drive means for the locking arm 16.

Whereas in this embodiment the locking pin 17 engages in the radial direction in the belt pulley 3, it may also be envisaged that an engagement takes place in an axially parallel direction. This is illustrated at II in FIG. 3. The belt pulley 3 is shown here in a radial plan view with an outer toothed arrangement 19 for the toothed belt 2. Here recesses 21 are arranged parallel to an axis 20, which also forms the axis of the threaded spindle 4 as well as the rotation axis of the belt pulley 3, wherein a pin 22 movable parallel to the axis 20 can engage in said recesses in order to lock the belt pulley 3. The electromechanical actuator 18, the construction of which is known per se, is again provided for the drive.

In the normal operation of the steer-by-wire steering system an electronic control ensures that the adjustment cam 7 or the actuator 18 is not moved to the non-blocked position. The steer-by-wire steering then operates in such a way that the rotation of the steering wheel is sensed by a sensor and a corresponding triggering of the electric motor 30 with the motor pinion 1 leads via the gearbox 2, 3 to an axial displacement of the threaded spindle 4, which in turn correspondingly activates the steered wheels. The driver can then perform the steering operation, as in a conventional steering system. When the engine is switched off and the vehicle is left the electronic control acts so that the belt pulley 3 is locked by the adjustment cam 7 and by the actuator 18. In addition a blocking or locking of the steering wheel 32 can be provided as in the prior art, so that the steering wheel 32 is not freely rotatable.

Theft of the thereby protected vehicle is made difficult by the fact that the steered wheels cannot be swivelled, even if the steering lock on the steering wheel side is forced. The blocking of the steered wheels makes it difficult to manipulate the vehicle, for example by shunting, towing or loading onto a conveyor vehicle.

It is also conceivable that vehicles with a steer-by-wire steering system can be made drivable even if the steering wheel is blocked, in that the electronic control is engaged and the steering gear is driven independently of the rotation of the steering column. The vehicle can then be controlled, at least for the purposes of loading it onto a conveyor vehicle, even when the steering lock on the steering wheel side is blocked. This type of engagement is prevented or at least made more difficult by the locking, in accordance with the invention, of the steer-by-wire steering system on the gearbox side.

As discussed above, it is further contemplated that the drive may be a tube motor that engages directly with a recirculating ball system 33 or a shaft gear arrangement, which may also be indicated by element 33. That is, element 33 may include such a motor, which may, in such an embodiment, control rotation of a ball nut 31, as is known in the art, or element 33 may be, in some embodiments, a shaft gear arrangement.

The invention claimed is:

1. A steering device for a road vehicle according to the steer-by-wire principle, including:
   a steering wheel arranged to be operated by a driver;
   a steering gear that is not permanently mechanically coupled to the steering wheel, and which includes:
      an electric motor drive configured for swivelling steered wheels, wherein the electric motor drive comprises:
         an electric motor; and
         a gearbox, the gearbox comprising a belt drive including a toothed belt having teeth arranged on the outside of the toothed belt; and
      an electromechanical locking device on or in the steering gear for locking the electric motor drive, the electromechanical locking device comprising a brake shoe having a toothed arrangement compatible with and facing towards the teeth on the outside of the toothed belt, wherein the brake shoe is pressed in a radial direction against the belt drive to positively engage the toothed arrangement with the teeth when the electromechanical locking device is in a locked state.

2. The steering device according to claim 1, wherein the belt drive further includes a pinion and a belt pulley, and wherein the belt pulley is coupled via the gearbox to a threaded spindle.

3. The steering device according to claim 2, wherein the steering gear comprises a toothed belt gear, and wherein the steering system further comprises:
   a recirculating ball system configured to convert rotational movement of the toothed belt gear into a linear movement of the threaded spindle; and
   a locking element configured to block the toothed belt gear.

4. The steering device according to claim 1, wherein the brake shoe is operated via a cam and a return spring.

5. The steering device according to claim 1, wherein the belt drive includes a belt pulley, and wherein the brake shoe is configured to be pressed against the belt pulley.

6. The steering device according to claim 1, wherein the device is further configured to ensure that the steering wheel is not freely rotatable when the electromechanical locking device is engaged.

* * * * *